United States Patent [19]

Pham

[11] Patent Number: 5,634,291
[45] Date of Patent: Jun. 3, 1997

[54] LIVE BAIT AND TACKLE CONTAINER

[76] Inventor: Paul Pham, 2021 S. Highway 288B, Angleton, Tex. 77515

[21] Appl. No.: 581,908

[22] Filed: Jan. 2, 1996

[51] Int. Cl.$^6$ .......................... A01K 97/05; A01K 97/22
[52] U.S. Cl. ........................................ 43/57; 43/56
[58] Field of Search ........................... 43/54.1, 55, 56, 43/57, 57.1; 206/315.11; 261/121.2

[56] References Cited

U.S. PATENT DOCUMENTS

| | | | |
|---|---|---|---|
| 515,899 | 3/1894 | Breithaupt . | |
| 2,870,932 | 1/1959 | Davis | 43/56 |
| 3,217,444 | 11/1965 | Howard | 43/57 |
| 3,344,552 | 10/1967 | Glasco | 43/56 |
| 3,958,359 | 5/1976 | Doughty | 43/55 |
| 4,096,657 | 6/1978 | Morrow | 43/56 |
| 4,529,112 | 7/1985 | Miller | 43/21.2 |
| 4,541,539 | 9/1985 | Matthews | 43/26 |
| 5,131,179 | 7/1992 | McEwen | 43/21.2 |
| 5,193,301 | 3/1993 | Figgins | 43/57 |
| 5,305,542 | 4/1994 | Phelps | 43/57 |
| 5,319,877 | 6/1994 | Hagan | 43/56 |
| 5,471,779 | 12/1995 | Downey | 43/54.1 |

*Primary Examiner*—Jeanne Elpel
*Attorney, Agent, or Firm*—Michael I. Kroll

[57] ABSTRACT

A live bait and tackle container (10) comprising a bucket (12) for storing water (14), so as to hold live bait therein. An assembly (16) is for aerating the water (14) within the bucket (12), to keep the bait alive over a long period of time. A facility (18) is for retaining various articles (20) on the bucket (12), so as to satisfy the needs of a fisherman.

12 Claims, 2 Drawing Sheets

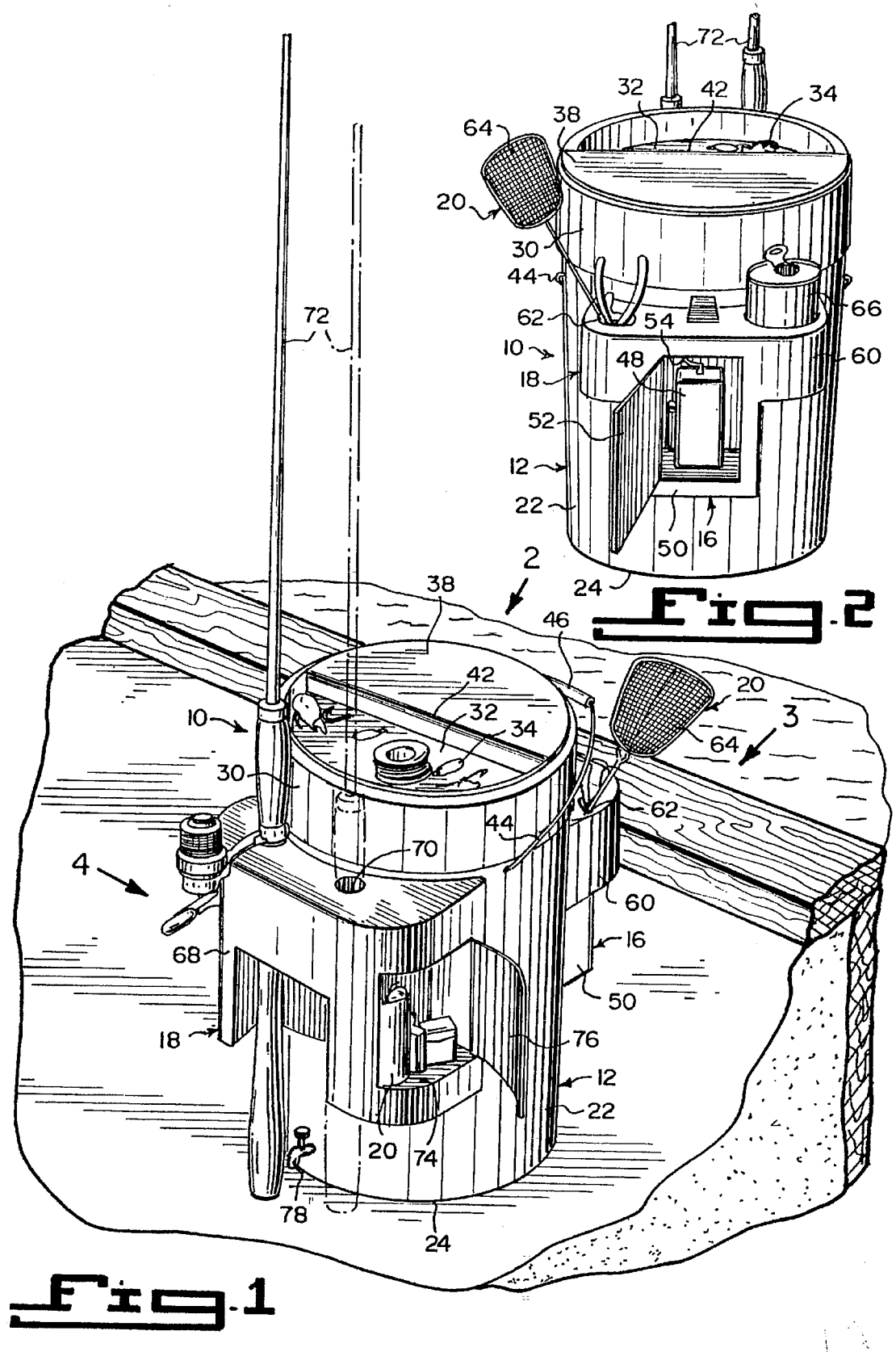

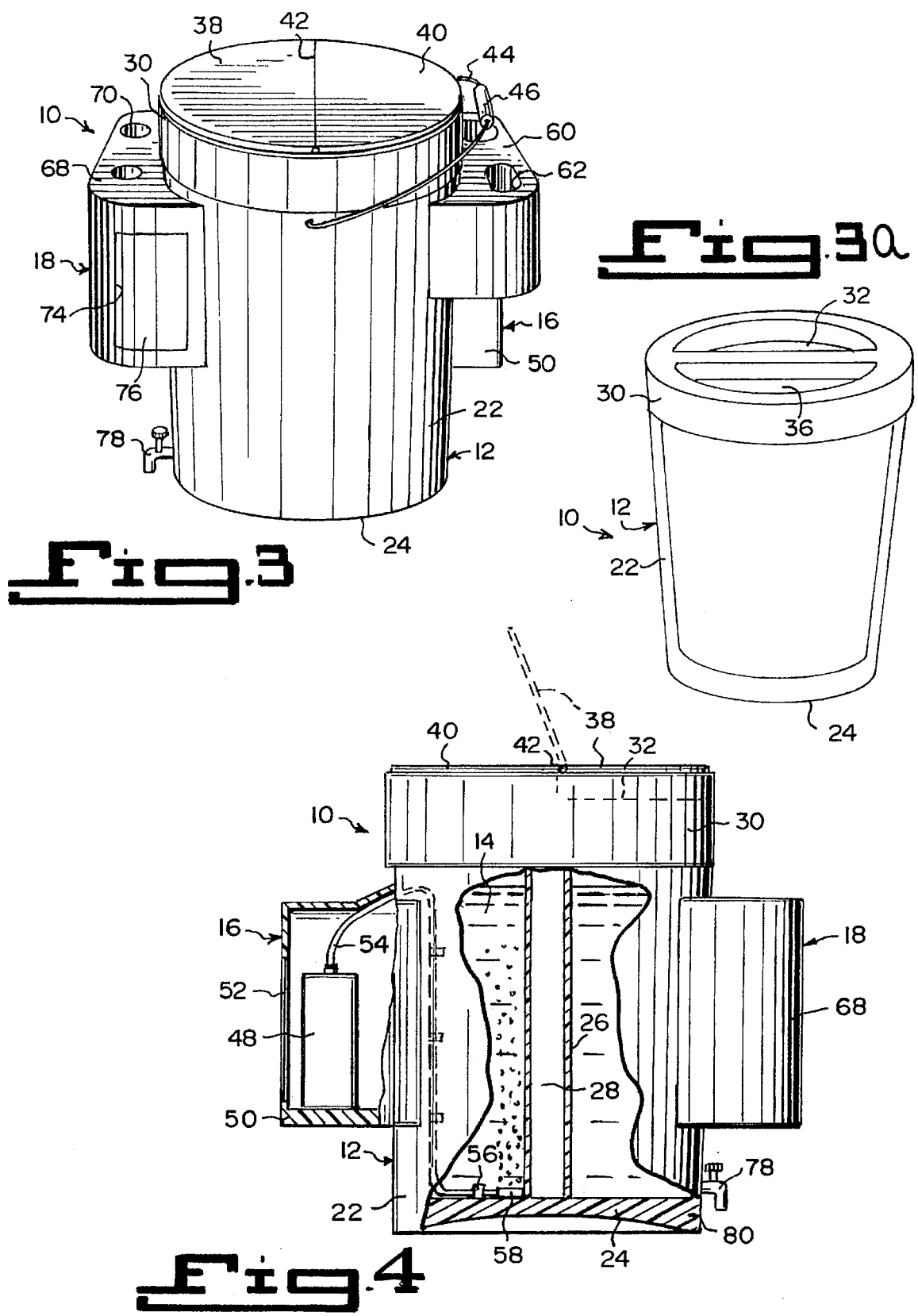

LIVE BAIT AND TACKLE CONTAINER

BACKGROUND OF THE INVENTION

1. Field of the Invention

The instant invention relates generally to fishing equipment and more specifically it relates to a live bait and tackle container.

2. Description of the Prior Art

Numerous fishing equipment have been provided in prior art. For example, U.S. Pat. Nos. 515,899 to Breithaupt; 4,529,112 to Miller; 5,131,179 to McEwen and 5,193,301 to Figgins all are illustrative of such prior art. While these units may be suitable for the particular purpose to which they address, they would not be as suitable for the purposes of the present invention as heretofore described.

BREITHAUPT, ERNEST T.

COMBINED BAIT AND FISHING TACKLE BOX

U.S. Pat. No. 515,899

The invention relates to improvements in bait boxes, being to provide a light, simple, and convenient contrivance designed to be strapped to a body of a person, and to accommodate fish bait, hooks, sinkers, quills, and lines, whereby the same may be conveniently carried, are safe and accessible. The bait and tackle box, has a hinged cover at one side provided with a securing device. The bait box is secured to an outer surface of the cover and is provided with a hinged lid.

MILLER, GEORGE A.

CARRIER FOR FISHING RODS AND TACKLE

U.S. Pat. No. 4,529,112

A carrier for fishing rods and tackle to be worn by a fisherman comprises a carrier plate worn adjacent the hip on one side of the fisherman and supported by a shoulder strap. A tackle box is pivotally mounted on the carrier plate to be selectively pivoted between a vertically oriented position and a horizontally oriented position. A latch is for latching the tackle box in its vertically oriented position. A tackle drawer is slidably mounted in the tackle box through an open side thereof. A telescoping and rotatable arm assembly mounts the drawer in the tackle box. The drawer may be pulled out of the tackle box in its vertically oriented position and rotated to a horizontal position in front of and adjacent the waist of the fisherman. A drawer latch is for selectively latching the drawer in its closed position inside of the tackle box or in its open, horizontal position. Fishing rod holders are mounted on the tackle box for holding fully assembled fishing rods and reels or disassembled sections of one or more fishing rods thereon. One or more of the holders are channel-shaped and have an elongated recess for receiving a fishing rod and reel. Devices extend over the recess for securing the fishing rod and reel therein.

McEWEN, WILLIAM H.

DUAL FISHING POLE HOLDERS ATTACHED TO PORTABLE FISH BUCKET

U.S. Pat. No. 5,131,179

A fishing device includes a portable fish bucket and two tripods attached on opposite sides of the bucket. Each of the tripods has two front legs pivotally connected by a first sleeve to a tube for holding a single fishing pole by its handle portion. Each of the tripods is secured by two different subcombinations to the bucket. The first subcomination includes a second sleeve slipped over an upper end of the tube and fastened by an elastic cord to a handle of the bucket. The second subcombination includes a leak proof nut and bolt arrangement connected through a lower end of the tube near to a bottom edge of the bucket. This nut and bolt arrangement allows the tube to be pivotally inclined at a selected angle from a vertical axis of the bucket. Thus, this device allows a fisher to have two unattended steady fishing pole lines in the water at the same time.

FIGGINS, JAMES E.

INSULATED FLOATING AC/DC POWER PUMP MINNOW BUCKET

U.S. Pat. No. 5,193,381

A portable bait or minnow bucket comprises an inner bucket for holding bait designed to fit within an insulated receptacle. Two pumps, one AC and the other DC, are located in a water-proof enclosure in the receptacle. A vent tube provides air to the pumps. Upon actuation, the selected pump provides air through a nozzle in the receptacle and air bubbles rise through openings in the bottom of the bucket to aerate the water when the bucket is within the receptacle. The bucket, when removed from the receptacle, will float in the water.

SUMMARY OF THE INVENTION

A primary object of the present invention is to provide a live bait and tackle container that will overcome the shortcomings of the prior art devices.

Another object is to provide a live bait and tackle container with a built-in air pump to aerate water in a bait compartment for keeping bait alive within the bait compartment.

An additional object is to provide a live bait and tackle container that will hold fishing rods in position for fishing and retain other items and also container a tackle storage area, so as to satisfy the needs of a fisherman.

A further object is to provide a live bait and tackle container that is simple and easy to use.

A still further object is to provide a live bait and tackle container that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view of the invention placed upon the ground adjacent a body of water.

FIG. 2 is a perspective view of the invention taken in the direction of arrow 2 in FIG. 1.

FIG. 3 is a perspective view of the invention taken in the direction of arrow 3 in FIG. 1.

FIG. 3a is a diagrammatic perspective view of the bucket frame.

FIG. 4 is an elevational view with parts broken away and in section taken in the direction of arrow 4 in FIG. 1.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 through 4 illustrate a live bait and tackle container 10 comprising a bucket 12 for storing water 14, so as to hold live bait therein. An assembly 16 is for aerating the water 14 within the bucket 12, to keep the bait alive over a long period of time. A facility 18 is for retaining various articles 20 on the bucket 12, so as to satisfy the needs of a fisherman.

The bucket 12 includes a peripheral side wall 22, a bottom wall 24 and a central support 26, having an air chamber 28. A top piece 30 has a semicircular storage compartment 32 on one side, to store tackle 34 and the like therein and a semicircular opening 36, to gain access into the water 14 to remove the bait therefrom.

A first semicircular lid 38 fits over the semicircular storage compartment 32 in the top piece 30. A second semicircular lid 40 fits over the semicircular opening 36 in the top piece 30. A common hinge 42 is between abutting straight sides of the first semicircular lid 38 and the second semicircular lid 40. The bucket 12 further includes a handle 44 and a hand grip 46 on the handle 44, so that a person can grasp the hand grip 46 to carry the bucket 12 from place to place.

The aerating assembly 16 consists of an air pump 48. A housing 50 is on an exterior surface of the bucket 12, for holding the air pump 48. A door 52 is hinged on the housing 50, to gain access to the air pump 48. An air tube 54 extends from the air pump 48 into the water 14 in the bucket 12. A plurality of clips 56 are for maintaining the air tube 54 against an interior surface of the bucket 12. An air stone 58 is on a distal end of the air tube 54, for producing air bubbles within the water 14 to aerate the water 14 for the live bait.

The article retaining facility 18 includes a holder 60 on the air pump housing 50. The holder 60 has a plurality of top recesses 62 to hold various articles 20 therein, such as tools 64 and a soda can 66. The structure retaining facility 18 further including a structure 68 is on the bucket 12 opposite from the aerating assembly 16. The structure 68 has two vertical apertures 70 therethrough to hold at least two fishing rods 72 in upright positions, so that a fisherman does not have to hold the two fishing rods 72 when fishing.

The structure 68 further includes two side storage compartments 74, for holding various articles 20 therein. Each side storage compartment 74 contains a hinged door 76, to maintain the various articles 20 therein.

A faucet 78 is on a lower portion of the bucket 12, to drain the water 14 out therefrom when not in use. The bucket 12 is fabricated out of a strong durable material 80, so that the fisherman may utilize the bucket 12 as a seat. The strong durable material 80 is plastic.

OPERATION OF THE INVENTION

To use the live bait and tackle container 10, the following steps should be taken:

1. Place the bucket 12 upon the ground near a body of water.
2. Open the second semicircular lid 40.
3. Pour the water 14 into the bucket 12.
4. Insert the live bait into the water 14.
5. Close the second semicircular lid 40.
6. Put the fishing rods 72 into the vertical apertures 70 in the structure 68.
7. Open the first semicircular lid 38.
8. Remove the tackle 34 from the semicircular storage compartment 32.
9. Place and remove the articles 20 in the top recesses in the holder 60.
10. Place and remove the articles 20 in the side storage compartments in the structure 68.

LIST OF REFERENCE NUMBERS 10 live bait and tackle container
12 bucket of 10
14 water in 12
16 aerating assembly of 10
18 article retaining facility of 10
20 article
22 peripheral side wall of 12
24 bottom wall of 12
26 central support of 12
28 air chamber in 26
30 top piece of 12
32 semicircular storage compartment in 30
34 tackle in 32
36 semicircular opening in 30
38 first semicircular lid on 32
40 second semicircular lid on 36
42 common hinge between 38 and 40
44 handle on 12
46 hand grip on 44
48 air pump of 16
50 housing for 48
52 door on 50
54 air tube of 16
56 clip of 16
58 air stone of 16
60 holder
62 top recess in 60
64 tool of 20
66 can of 20
68 structure of 18
70 vertical aperture in 68
72 fishing rod
74 side storage compartment in 68
76 hinged door of 74
78 faucet on 12
80 strong durable material for 12

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A live bait and tackle container comprising
   a) a bucket for storing water, so as to hold live bait therein;
   b) means for aerating the water within said bucket, to keep the bait alive over a long period of time; and
   c) means for retaining various articles on said bucket, said article retaining means including a structure on said bucket opposite from said aerating means, said structure having i) at least two vertical apertures therethrough to hold at least two fishing rods in upright positions and ii) two side storage compartments for holding various articles therein, wherein each said side storage compartment includes a hinged door to maintain the various articles therein.

2. A live bait and tackle container comprising:
   a) a bucket for storing water, so as to hold live bait therein, said bucket including:
      i) a peripheral side wall;
      ii) a bottom wall;
      iii) a central support having an air chamber; and
      iv) a top piece having a semicircular storage compartment to store tackle therein and a semicircular opening to gain access into the water to remove the bait therefrom:
   b) means for aerating the water within said bucket, to keep the bait alive over a long period of time; and
   c) means for retaining various articles on said bucket.

3. A live bait and tackle container as recited in claim 2, further including:
   a) a first semicircular lid to fit over said semicircular storage compartment in said top piece;
   b) a second semicircular lid to fit over said semicircular opening in said top piece; and
   c) a common hinge between abutting straight sides of said first semicircular lid and said second semicircular lid.

4. A live bait and tackle container as recited in claim 3, wherein said bucket further includes:
   a) a handle; and
   b) a hand grip on said handle, so that a person can grasp said hand grip to carry said bucket from place to place.

5. A live bait and tackle container as recited in claim 4, wherein said aerating means includes:
   a) an air pump;
   b) a housing on an exterior surface of said bucket for holding said air pump;
   c) a door hinged on said housing to gain access to said air pump;
   d) an air tube extending from said air pump into the water in said bucket;
   e) a plurality of clips for maintaining said air tube against an interior surface of said bucket; and
   f) an air stone on a distal end of said air tube for producing air bubbles within the water to aerate the water for the live bait.

6. A live bait and tackle container as recited in claim 5, wherein said article retaining means includes a holder on said air pump housing, said holder having a plurality of top recesses to hold various articles therein.

7. A live bait and tackle container as recited in claim 6, wherein said article retaining means includes a structure on said bucket opposite from said aerating means, said structure having two vertical apertures therethrough to hold at least two fishing rods in upright positions.

8. A live bait and tackle container as recited in claim 7, wherein said structure further includes two side storage compartments for holding various articles therein.

9. A live bait and tackle container as recited in claim 8, wherein each said side storage compartment includes a hinged door to maintain the various articles therein.

10. A live bait and tackle container as recited in claim 9, further including a faucet on a lower portion of said bucket to drain the water out therefrom when not in use.

11. A live bait and tackle container as recited in claim 10, wherein said bucket is fabricated out of a strong durable material.

12. A live bait and tackle container as recited in claim 11, wherein said material is plastic.

* * * * *